United States Patent
Hsu

(10) Patent No.: US 11,332,018 B2
(45) Date of Patent: May 17, 2022

(54) BATTERY REGENERATIVE BRAKING CONTROL METHOD

(71) Applicant: Acer Incorporated, New Taipei (TW)

(72) Inventor: Chu-Hsiang Hsu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 243 days.

(21) Appl. No.: 16/821,187

(22) Filed: Mar. 17, 2020

(65) Prior Publication Data

US 2021/0162868 A1   Jun. 3, 2021

(30) Foreign Application Priority Data

Nov. 28, 2019   (TW) .................................. 108143343

(51) Int. Cl.
| | |
|---|---|
| *H02J 7/04* | (2006.01) |
| *H02J 7/16* | (2006.01) |
| *B60L 7/10* | (2006.01) |
| *H02J 7/14* | (2006.01) |
| *B60L 50/60* | (2019.01) |
| *H02J 7/24* | (2006.01) |

(52) U.S. Cl.
CPC ............... *B60L 7/10* (2013.01); *B60L 50/66* (2019.02); *H02J 7/1423* (2013.01); *H02J 7/2434* (2020.01); *B60L 2240/12* (2013.01)

(58) Field of Classification Search
CPC ....................................................... B60L 7/10
USPC ....................................................... 320/145
See application file for complete search history.

(56) References Cited

U.S. PATENT DOCUMENTS

| | | | | |
|---|---|---|---|---|
| 2004/0206561 | A1* | 10/2004 | Song .................... | B60K 25/10 180/165 |
| 2007/0095586 | A1* | 5/2007 | Luedtke .................. | B60L 7/10 180/65.31 |
| 2010/0004807 | A1 | 1/2010 | Kydd | |
| 2012/0138375 | A1* | 6/2012 | Hughes .................... | B60L 7/26 180/65.1 |
| 2012/0179347 | A1* | 7/2012 | Aldighieri ......... | B60W 50/0097 701/70 |

FOREIGN PATENT DOCUMENTS

| | | |
|---|---|---|
| CN | 2913079 Y | 6/2007 |
| CN | 103072493 A | 5/2013 |
| CN | 103402809 A | 11/2013 |

(Continued)

*Primary Examiner* — Yalkew Fantu
(74) *Attorney, Agent, or Firm* — Birch, Stewart, Kolasch & Birch, LLP

(57) ABSTRACT

A battery regenerative breaking control method applied in an electric vehicle is provided. The battery regenerative breaking control method includes: determining whether a battery pack is at a protection status when the electric vehicle is detected to be at a regenerative breaking status; recording a current battery error time point and obtaining a time threshold according to a current speed of the electric vehicle if it is determined that the battery pack is at the protection status; determining whether a current time is smaller than the time threshold; entering a first stage to adjust a pulse width modulation (PWM) duty cycle if the current time is smaller than the time threshold; and entering a second stage to adjust a PWM frequency if the current time is larger than the time threshold.

8 Claims, 2 Drawing Sheets

(56) References Cited

FOREIGN PATENT DOCUMENTS

| | | |
|---|---|---|
| CN | 104638318 A | 5/2015 |
| KR | 10-2013-0008350 A | 1/2013 |
| TW | 200718584 A | 5/2007 |
| TW | 201014114 A1 | 4/2010 |
| TW | 201213177 A1 | 4/2012 |
| TW | 201618981 A | 6/2016 |
| TW | I606670 B | 11/2017 |

* cited by examiner

BATTERY REGENERATIVE BRAKING CONTROL METHOD

This application claims the benefit of Taiwan application Serial No. 108143343, filed Nov. 28, 2019, the subject matter of which is incorporated herein by reference.

BACKGROUND OF THE INVENTION

Field of the Invention

The invention relates in general to a battery regenerative breaking control method, and more particularly to a battery regenerative breaking control method applied in an electric vehicle (electric car or electric motor bike).

Description of the Related Art

As environmental awareness arises worldwide, people try to reduce their reliance on petrochemical energy. Therefore, the electric vehicle driven by electric power, which is environmental friendly and pollution-free, has attracted people's attention.

The brushless DC motor commonly used in the electric vehicle is a DC hub motor. The DC hub motor has the advantages of reducing the space occupied by hardware, reducing weight, dispensing decelerator, reducing cost, simplifying transmission mechanism and control system, and increasing the operation efficiency of the overall drive system.

During the driving process of a conventional electric motor bike (or electric bike), vehicle braking is achieved by increasing the friction force of tires through mechanical braking, which converts the kinetic energy of the motor bike into heat energy to reduce the speed.

In view of energy, when the electric vehicle is at a braking status, energy will be consumed. Meanwhile, if the kinetic energy that needs to be consumed can be converted into electric energy, which is then returned to the battery end, both the electric braking function and the energy recycling function can be achieved, and the said design is a crucial direction to increasing the cruising endurance of the electric vehicle.

The most commonly seen regenerative braking architectures can be divided into two types. (1) The first type requires additional circuit design (such as boost charging circuit, constant voltage circuit and consumption resistance circuit used to consume superfluous kinetic energy). (2) The second type does not require additional hardware circuit, and achieves energy recycling through logic switch.

In the second type of regenerative braking architecture (which does not require additional hardware circuit), the returned current directly enters the battery pack. However, if the battery pack is at a recharge status over a long period (for example, when the vehicle is going down the hill), the battery pack may generate a charge protection mechanism if the amount of current returned to the battery pack is too large. Under such circumstances, if the generated charge current cannot be additionally consumed, the charge current can only flow to the motor or the battery, which has already triggered a protection mechanism, and the probability of the motor or the battery pack being damaged will increase.

SUMMARY OF THE INVENTION

According to one embodiment of the invention, a battery regenerative breaking control method applied in an electric vehicle is provided. The battery regenerative breaking control method includes: determining whether a battery pack is at a protection status when the electric vehicle is detected to be at a regenerative breaking status; recording a current battery error time point and obtaining a time threshold according to a current speed of the electric vehicle if it is determined that the battery pack is at the protection status; determining whether a current time is smaller than the time threshold; entering a first stage to adjust a pulse width modulation (PWM) duty cycle if the current time is smaller than the time threshold; and entering a second stage to adjust a PWM frequency if the current time is larger than the time threshold.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
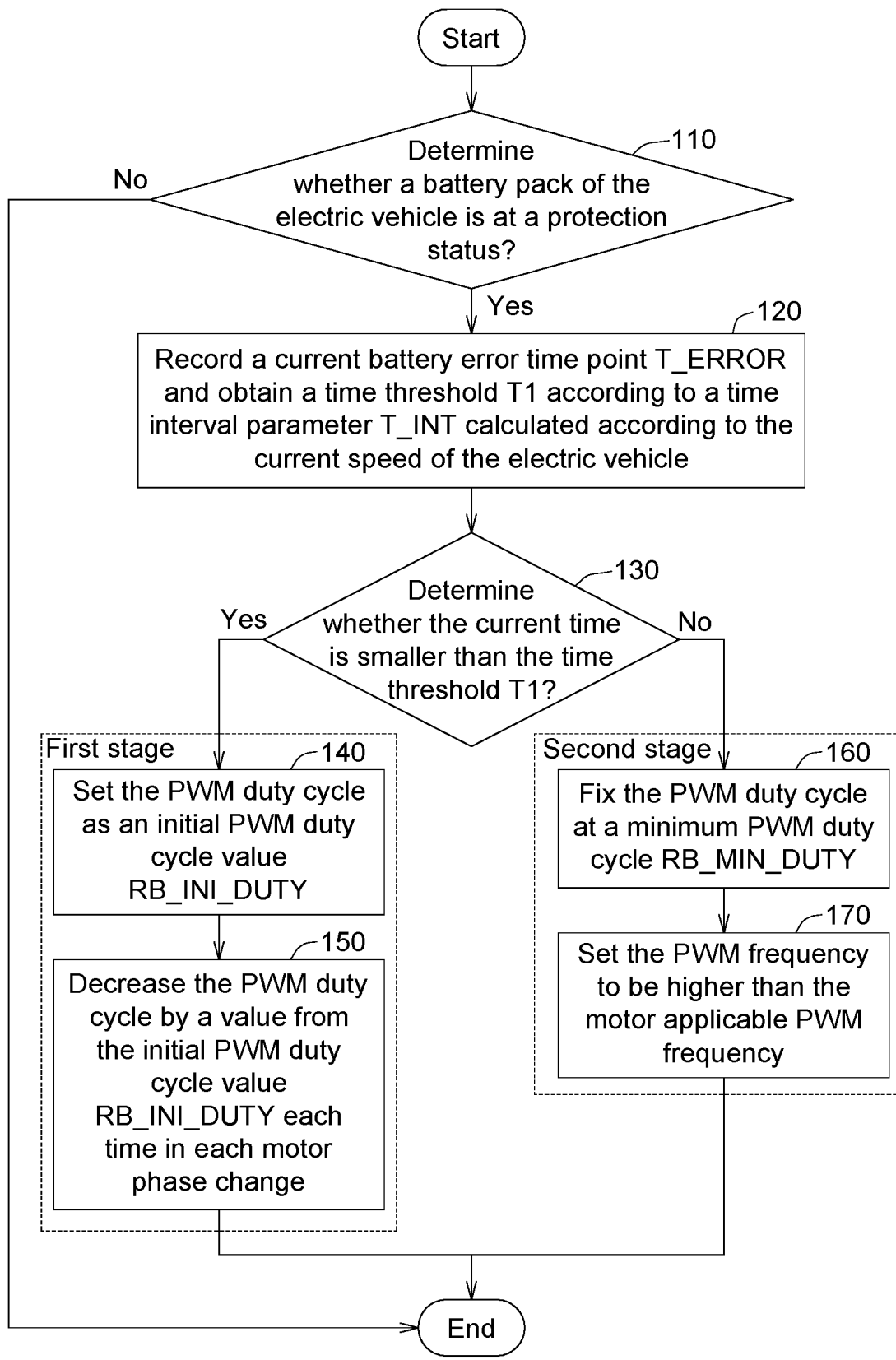
FIG. 1 is a flowchart of a battery regenerative breaking control method applicable to an electric vehicle according to an embodiment of the invention.
Figure 2:
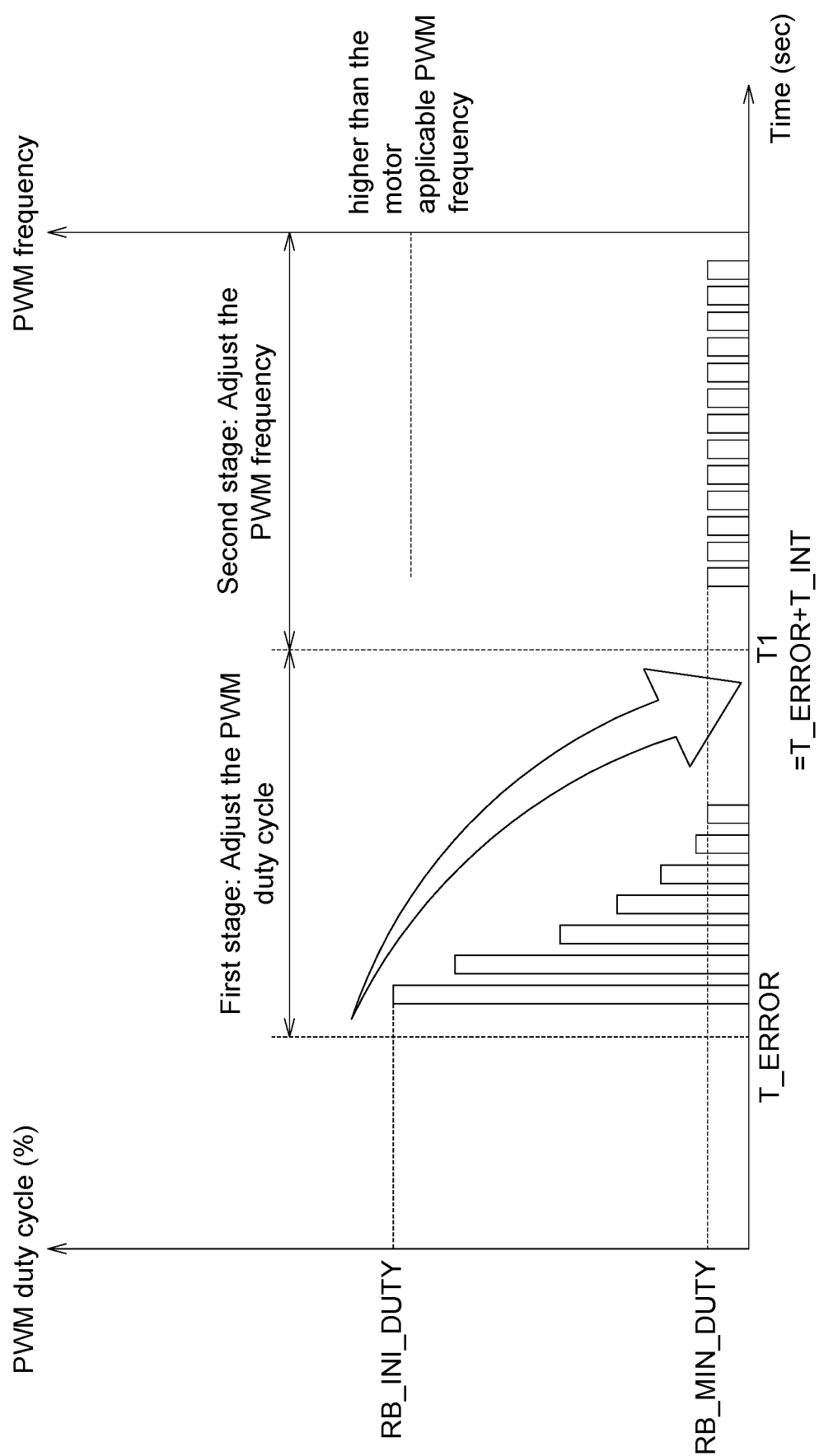
FIG. 2 is a schematic diagram of PWM duty cycle, PWM frequency and time according to an embodiment of the invention.

FIG. 1 a flowchart of a battery regenerative breaking control method applicable to an electric vehicle (electric car or electric motor bike) according to an embodiment of the invention. FIG. 2 is a schematic diagram of PWM duty cycle, PWM frequency and time according to an embodiment of the invention.

When a motor controller detects that the electric vehicle (electric car or electric motor bike) is currently at a regenerative breaking status, the battery regenerative breaking control method according to an embodiment of the invention of FIG. 1 can be started.

Refer to FIG. 1. In step 110, whether a battery pack of the electric vehicle is at a protection status (such as whether a charge current of the battery pack is too large or whether a current voltage of the battery pack is too large) is determined. If the determination in step 110 is negative, the method terminates. If the determination in step 110 is affirmative, the method proceeds to step 120, a current battery error time point T_ERROR is recorded, and a time threshold T1 is obtained according to a time interval parameter T_INT calculated according to the current speed of the electric vehicle.

In a possible example of the invention, the value of the time threshold T1 is adjusted according to a current speed of the electric vehicle. The value of T1 is calculated as: T1=T_ERROR+T_INT, wherein, T_ERROR represents an error time point of the battery pack, and T_INT represents a time interval parameter. The time interval parameter T_INT includes but is not limited to T_INT=V*K, wherein, V represents a current speed of the electric vehicle (Km/hr) and K represents a constant (includes but is not limited to K=0.3). Therefore, when the current speed of the electric vehicle is 40 Km/hr, the time interval parameter T_INT is calculated as: T_INT=40*0.3=12 (seconds).

In step 130, whether the current time is smaller than the time threshold T1 is determined. If the determination in step 130 is affirmative (the current time is smaller than the time threshold T1), then the method enters the first stage. If the determination in step 130 is negative (the current time is larger than the time threshold T1), then the method enters the second stage.

In an embodiment of the invention, during the first stage, the PWM duty cycle is adjusted (that is, the PWM duty cycle is gradually reduced) to reduce the amount of the current returned to the battery pack and the speed of the vehicle. In the second stage, the PWM frequency is adjusted (that is, the PWM frequency is pulled up) to consume excessive kinetic energy by converting it into heat energy.

During the first stage as indicated in step 140, the PWM duty cycle is set as an initial PWM duty cycle value RB_INI_DUTY. In a possible example, the initial PWM duty cycle value RB_INI_DUTY includes but is not limited to 40%.

During the first stage as indicated in step 150, the PWM duty cycle decreases from the initial PWM duty cycle value RB_INI_DUTY by a value (includes but is not limited to 5%) each time in each motor phase change (that is, each time when the motor changes the operation phase).

Since the recharge current is relevant with the PWM duty cycle, the larger the PWM duty cycle, the larger the recharge current, and relatively, the stronger the braking force. In an embodiment of the invention, during the first stage, the set initial PWM duty cycle value RB_INI_DUTY (includes but is not limited to 40%) does not cause the electric vehicle to stop immediately (when going down the hill), but allows the electric vehicle to maintain a moving status and at the same time reduce the speed of the vehicle. Meanwhile, there will not be a large amount of current returning to the battery pack. Therefore, the purpose of the first stage is to reduce the speed of the vehicle without generating too much current to the battery pack.

During the second stage, as indicated in step 160, the PWM duty cycle is fixed at a minimum PWM duty cycle RB_MIN_DUTY. In a possible example, the value of the minimum PWM duty cycle RB_MIN_DUTY includes but is not limited to 5%.

During the second stage, as indicated in step 170, the PWM frequency is set to be higher than the motor applicable PWM frequency. If the set PWM frequency is higher than the motor applicable PWM frequency, the motor will not operate, but the internal switch of the motor (such as the MOS transistor) will switch according to the set PWM frequency. Thus, during the second stage, most of the electric energy (generated from braking) is converted into heat energy, which is generated from the switching of the MOS transistor. That is, the electric energy generated from braking is consumed by the switching of the MOS transistor. In an embodiment of the invention, the electric energy generated from braking is prevented from operating on the motor and generating current. In an embodiment of the invention, since the electric energy is additionally consumed, the current will not flow in the motor at random, and the motor will not be damaged by excessive recharge current. Since the recharge current is consumed in the form of heat energy, the battery pack will not be burnt by excessive recharge current. Therefore, the invention avoids the motor and the battery pack being affected by the recharge current.

As disclosed above, the invention, under a low cost (without adding any hardware circuit) regenerative breaking architecture, can regenerate the current and at the same time avoid the excessive recharge current damaging the battery pack or the motor.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A battery regenerative breaking control method applied in an electric vehicle, the battery regenerative breaking control method comprising:
   determining whether a battery pack is at a protection status when the electric vehicle is detected to be at a regenerative breaking status;
   recording a current battery error time point and obtaining a time threshold according to a current speed of the electric vehicle if it is determined that the battery pack is at the protection status;
   determining whether a current time is smaller than the time threshold;
   entering a first stage to adjust a pulse width modulation (PWM) duty cycle if the current time is smaller than the time threshold; and
   entering a second stage to adjust a PWM frequency if the current time is larger than the time threshold.

2. The battery regenerative breaking control method according to claim 1, wherein, when determining whether the battery pack is at the protection status, whether a charge current of the battery pack is too large or whether a current voltage of the battery pack is too large is determined.

3. The battery regenerative breaking control method according to claim 1, wherein, a time interval parameter is calculated according to the current speed of the electric vehicle, and the time threshold is obtained according to the recorded current battery error time point and the time interval parameter.

4. The battery regenerative breaking control method according to claim 3, wherein, the time threshold is equivalent to the sum of the current battery error time point and the time interval parameter.

5. The battery regenerative breaking control method according to claim 1, wherein, during the first stage, the PWM duty cycle is set as an initial value of PWM duty cycle.

6. The battery regenerative breaking control method according to claim 5, wherein, during the first stage, the PWM duty cycle decreases from the initial value of PWM duty cycle each time in each phase change.

7. The battery regenerative breaking control method according to claim 6, wherein, during the second stage, the PWM duty cycle is fixed at a minimum PWM duty cycle.

8. The battery regenerative breaking control method according to claim 7, wherein, during the second stage, the PWM frequency is set to be over a motor applicable PWM frequency.

* * * * *